Feb. 13, 1934.  J. S. PARSONS  1,947,100
MEDIUM VOLTAGE NETWORK DISTRIBUTION SYSTEM
Filed Feb. 1, 1933  2 Sheets-Sheet 1
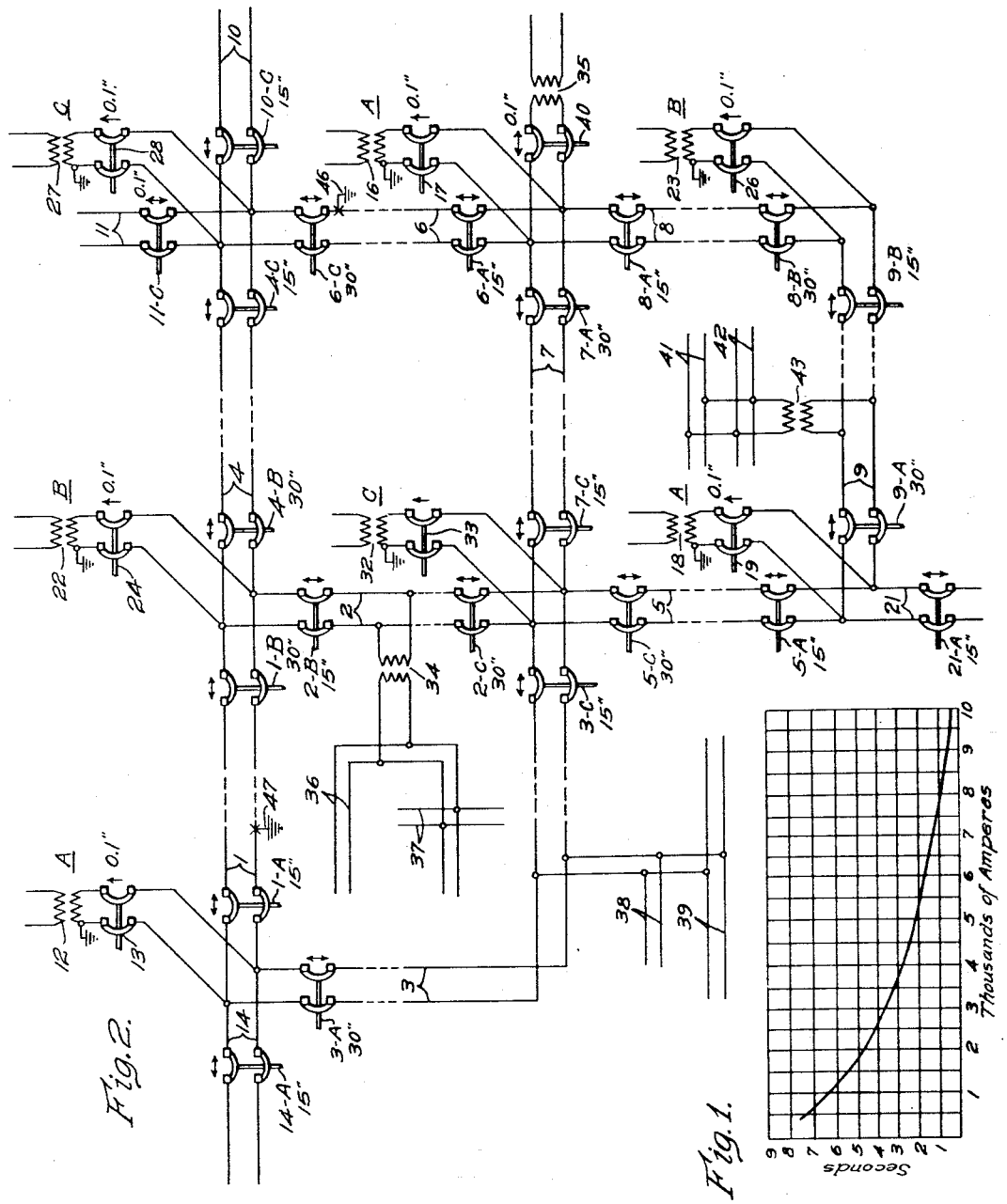
WITNESSES:
E. J. Weller.
Geo. O. Harrison.
INVENTOR
John S. Parsons.
BY
ATTORNEY Feb. 13, 1934.   J. S. PARSONS   1,947,100
MEDIUM VOLTAGE NETWORK DISTRIBUTION SYSTEM
Filed Feb. 1, 1933   2 Sheets-Sheet 2

WITNESSES:
*C. J. Weller*
*Geo. O. Harrison*

INVENTOR
*John S. Parsons*
BY
ATTORNEY

Patented Feb. 13, 1934

1,947,100

UNITED STATES PATENT OFFICE 1,947,100

MEDIUM VOLTAGE NETWORK DISTRIBUTION SYSTEM

John S. Parsons, Swissvale, Pa., assignor to Westinghouse Electric & Manufacturing Company, East Pittsburgh, Pa., a corporation of Pennsylvania Application February 1, 1933. Serial No. 654,637

6 Claims. (Cl. 175—294)

My invention relates to electrical distribution systems and particularly to such systems of the medium-voltage network or primary network type.

In my copending application, Serial No. 521,491, filed March 10, 1931, and assigned to the Westinghouse Electric & Manufacturing Company, there is disclosed a system of distribution in which the circuit breakers of a sectionalized network are controlled by means of definite time-element relays and automatic reclosing means in such a manner that a faulted section of the network is automatically disconnected without interruption of the power supply to the sound sections.

In accordance with the principle of the above-mentioned application, the circuit breakers at one end of each network main or section are controlled by definite time-element relays having a comparatively short time setting, and the circuit breakers at the other end of each network main are controlled by definite time-element relays having a comparatively long time setting. Upon the occurrence of a fault, all the network mains which transmit a substantial part of the fault current are disconnected at one end after a comparatively short time delay, and thereafter, the faulted main is disconnected at its other end to clear the fault. After the fault has been cleared, the open circuit breakers are automatically reclosed in a sequence which leaves the faulted main locked out in the case of a permanent fault or energized in the case of a self-clearing fault, and the circuit breakers of the sound mains closed.

Although the system disclosed in the above-mentioned application is sound in principle and satisfactory for the purposes contemplated, it is subject to the disadvantage that the clearing of network faults requires more circuit breaker operations than the minimum number necessary for clearing the fault.

It is accordingly an object of my invention to provide a novel distribution system of the type indicated above, in which unnecessary circuit breaker operations shall be reduced in number or eliminated.

Another object of my invention is to provide a novel distribution system of the network type in which the circuit breakers shall be opened in response to an overcurrent condition in such a manner that the maximum time of opening of the circuit breakers shall be reduced by an amount substantially proportional to the fault current, and that permanently faulted sections of the networks shall be locked out without interruption of the supply of power to sound sections.

Other objects of my invention will become evident from the following detailed description taken in conjunction with the accompanying drawings, in which:

Figure 1 is a time-current diagram showing the operating characteristics of the network overcurrent relays used in the practice of my invention;

Fig. 2 is a diagrammatic view of a distribution system embodying my invention;

Figure 3:
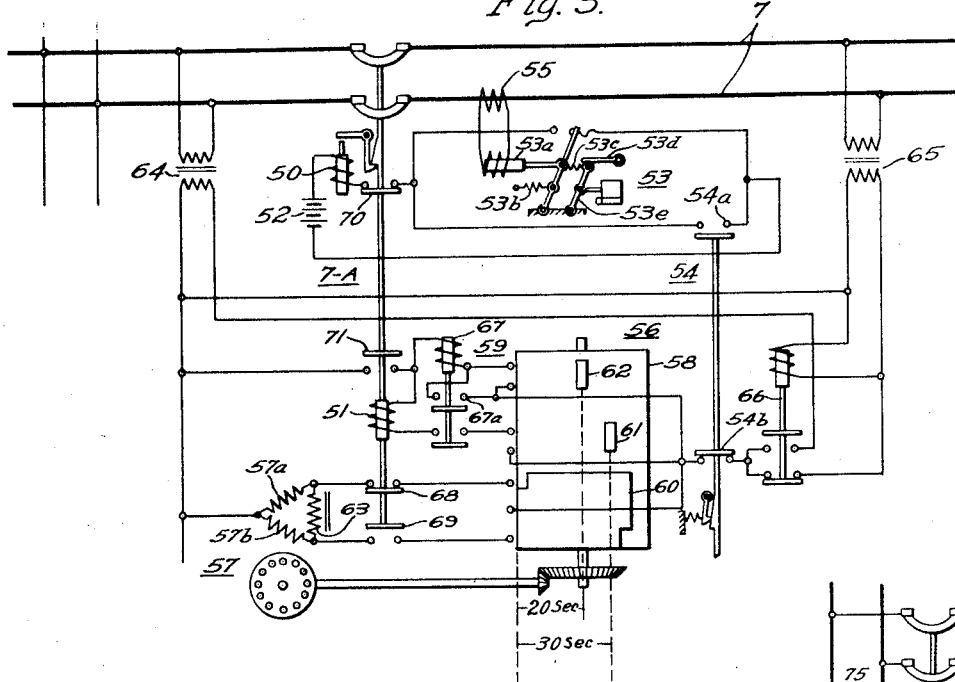
Fig. 3 is a diagrammatic view of the apparatus for controlling a network circuit breaker used in the practice of my invention.

In accordance with my invention, over-current relays of the variable characteristic or broad-range type, such as disclosed in the copending application of H. M. Smith, Serial No. 568,627, filed October 13, 1931, and assigned to the Westinghouse Electric & Manufacturing Company, are preferably used for controlling the opening of the network circuit breakers. Alternatively I may use broad-range characteristic relays of the type disclosed in the copending application of S. L. Goldsborough, Serial No. 621,143, filed July 7, 1932, and assigned to the Westinghouse Electric & Manufacturing Company. Such relays, whether of the Smith or Goldsborough type, have operating characteristics which approach a straight-line form as shown in Fig. 1, in which the ordinates denote time of operation in seconds and the abscissæ represent current values in thousands of amperes.

Referring to Fig. 2 which shows diagrammatically a primary network distribution system embodying my invention, a number of interconnected network mains are denoted by the reference numerals 1 to 9, inclusive. The network formed by the interconnected mains 1 to 9 is supplied at intersections from three sources A, B and C, by means of transformers 12, 16 and 18; 22 and 23; and 27 and 32 respectively. A plurality of transformer circuits 13, 17, 19, 24, 26, 28 and 33 are interposed between the transformers 12, 16, 18, 22, 23, 27 and 32, respectively, and the network.

Each of the network mains 1 to 9 is provided with a network circuit breaker at each end, denoted by a compound reference character such as 4—C, consisting of a numeral corresponding to the network main, and a letter corresponding to the source which supplies the adjacent transformer.

The system so far described will be recognized as an example of the primary network type distribution system. The sources A, B and C may be of different transmission or generated voltages, and the transformers 12, 16, 18, 22, 23, 27 and 32 are of proper ratio to maintain a medium voltage, such as 4000 volts, on the network mains 1 to 9. The apparatus adjacent one of the intersections, for example, the transformer 32 and the circuit breakers 33, 2—C, 3—C, 5—C and 7—C together with associated control apparatus (not shown in Fig. 1) may be manufactured and installed as a unit in the usual manner.

Loads which require the average continuity of service of the network are connected to low voltage circuits such as 36, 37, 41 and 42, energized by means of step down transformers, such as 34 and 43 from the network mains. Loads which require a higher degree of continuity of service may be supplied from the network intersections through transformers such as 35 and circuit breakers such as 40. Outlying loads may be supplied from the network by means of radial feeders such as 10, 11, 14 and 21 controlled by feeder circuit breakers 10—C, 11—C, 14—A and 21—A respectively. Medium voltage loads which do not require a degree of service continuity higher than that of the network mains may be supplied directly by means of primary laterals such as 38 and 39.

In accordance with the present invention, the network circuit breakers 1—B, 2—B, 4—B, etc., which are included in the mesh circuits of the network are controlled by means of broad-range or straight-line overcurrent relays, preferably of the type disclosed in the copending application of R. M. Smith mentioned above, and by automatic reclosing means, which will be hereinafter more fully described. The straight-line relays are adjusted in accordance with the fault current characteristics of the system in such a manner that each of the network circuit breakers 1—B, 2—B, 4—B, etc., may be opened with a comparatively short time delay, or preferably instantaneously, in response to the maximum fault current which can be supplied through the breaker, corresponding to a solid fault close to the breaker.

For fault currents less than the maximum the opening time of the circuit breakers increases approximately in direct ratio to the difference between the theoretical maximum fault current and the actual fault current, as shown by the substantially straight-line characteristic, Fig. 1.

The over-current relays (not shown in Fig. 2) are adjusted to respond to a minimum current value determined by the rated capacity of the transformer of the associated unit. For simplicity it will be assumed that the rated full load current of each of the transformers 12, 16, 18, 27 and 32 is 375 amperes, and the over-current relays are adjusted to respond to a minimum current of 500 amperes corresponding to 133% rated capacity of the transformer.

The over-current relays are also individually adjusted to operate substantially instantaneously in response to a maximum current value corresponding to the maximum fault current which can be supplied through the associated network breaker to a zero impedance fault close to the breaker. Obviously the latter relay adjustment will be different for different circuit breakers, depending upon the relative impedances of the paths from the sources to the various breakers, the voltage regulation of the sources and other factors. For purposes of illustration, however, it will be assumed that the maximum fault current which can be supplied through each of the network circuit breakers 1—A, 1—B, 2—B, etc., is the same, and as a concrete example, will be taken as 10,000 amperes for each breaker.

With the maximum and minimum operating conditions assumed the same for each over-current relay, the over-current relays may all be adjusted to operate with the characteristics shown in Fig. 1. Neglecting the comparatively small time element of the circuit breaker itself, it will be seen from Fig. 1 that the operating time of a network circuit breaker, such as 6—A, is substantially instantaneous for the maximum fault current of 10,000 amperes, 1 second for a fault current of 7500 amperes, 2 seconds for a fault current of 5000 amperes and so on up to 7.5 seconds for the minimum fault current of 500 amperes to which the circuit breaker responds.

It will be understood that the numerical values given above are arbitrarily chosen for purposes of illustration and that in practice the settings of each over-current relay would be determined individually in accordance with electrical conditions at the corresponding circuit breaker.

The reclosing apparatus for each of the network circuit breakers 1—B, 2—B, 4—B, etc., is designed to cause automatic reclosure of the circuit breaker with a time delay when either the network intersection adjacent the circuit breaker, or the network main controlled by the circuit breaker is energized. At intersections where more than two network mains are joined, such as the intersections supplied by the transformers 22 and 32, the apparatus for causing reclosure when only the network main is energized may be omitted, so that the circuit breaker is closed only when the intersection is energized.

The reclosing apparatus for each network circuit breaker is adjusted to cause closure of the circuit breaker in either a comparatively short time interval, which will be assumed as 15 seconds, or in a longer time interval which will be assumed as 30 seconds, after opening. The circuit breaker at one end of a network main is adjusted for the short reclosing time, and the circuit breaker at the other end is adjusted for the long reclosing time. For example, the network circuit breaker 6—A may be adjusted to reclose in 15 seconds, and the circuit breaker 6—C at the other end of the feeder 6 may be adjusted to reclose in 30 seconds.

Considering any mesh circuit of the network, for example, that formed by the network mains 2, 4, 6 and 7, the reclosing times of the circuit breakers included in the mesh are alternated around the mesh. It will be apparent that this arrangement can be followed throughout the network, for if the network unit at any corner of a mesh is omitted, two circuit breakers which would be included in the mesh are also omitted leaving an even number of circuit breakers in the mesh. For example, the mesh circuit consisting of network mains 1, 2 and 3 passes through three network units and includes six circuit breakers.

The reclosing apparatus of each of the circuit breakers 1—B, 2—B, 4—B, etc., is designed to reset in a comparatively short time interval, for example, 10 seconds, after a reclosure of the circuit breakers if the circuit breaker is not tripped open during the 10 second interval, but to lock out the circuit breaker if the latter trips open within 10 seconds after an automatic reclosure.

The transformer circuit breakers 13, 17, 19, 24, 26, 28 and 33 are controlled by means of power directional relays which are effective to open the corresponding transformer circuit breakers in response to power flow in excess of a predetermined value from the network to the corresponding transformer, and to automatically reclose the transformer circuit breaker when the magnitudes and phase position of the voltages on either side of the transformer circuit breaker are such that power will flow into the network upon closure of the breaker. The tripping speeds of the transformer circuit breakers for faults on the source side of the transformer may be comparatively high, and it will be assumed that 0.1 second is required for opening each of the transformer circuit breakers.

The operation of the system shown in Fig. 2 may be set forth as follows: It is assumed that the sources A, B and C are in operation, load currents are being drawn from the network and all circuit breakers are closed as shown in the figure.

Assuming that a zero impedance fault occurs at point 46 close to the circuit breaker 6—C, the maximum fault current of 10000 amperes flows from the upper right intersection of the network through the circuit breaker 6—C to the fault. A fault current of somewhat smaller value, because of the impedance of the network main 6, flows upward in the figure from the left center intersection of the network through the circuit breaker 6—A to the fault. It will be assumed that the latter fault current is 8000 amperes.

In order to obtain a rough approximation of the division of these fault currents at the network intersections without a detailed study of vector relationships, it will be assumed that all components of the fault currents are in phase, so that they may be added in the same manner as direct currents.

At the upper right network intersection, no fault current is supplied by the radial feeders 10 and 11 as these feeders are energized entirely from the network. The fault current of 10,000 amperes flowing through the circuit breaker 6—C is accordingly supplied by the transformer 27 and the network main 4. Assuming that 6000 amperes are supplied by the transformer 27, 4,000 amperes would be supplied by the network main 4. The over-current conditions at the instant of fault are, as may be seen from Fig. 1, such as to produce instantaneous opening of the circuit breaker 6—C, and opening of the circuit breakers 4—B and 4—C at the expiration of 2.5 seconds. Obviously because of the spread of 2.5 seconds, the circuit breaker 6—C trips open and thereby prevents the opening of circuit breakers 4—B and 4—C.

At the right center network intersection, the fault current of 8000 amperes divides between the transformer 16 and the network mains 7 and 8, as the load circuit controlled by the circuit breaker 40 supplies no current to the fault. Assuming that the transformer 16 supplies 4000 amperes and that the feeders 7 and 8 supply 2000 amperes each, the over-current conditions at the instant of fault are such as to produce opening of the circuit breaker 6—A in 1.0 second and opening of the circuit breakers 7—A, 7—C, 8—A and 8—B in 4.5 seconds. In this instance there is a spread of 3.5 seconds to insure opening of the network circuit breaker 6—A in the faulted main before the opening of circuit breakers in adjacent mains.

It will be apparent that under the conditions assumed, the circuit breakers 6—C and 6—A at the ends of the faulted main 6 open well in advance of the attainment of opening conditions for the circuit breakers in adjacent mains.

At the expiration of 16 seconds after the occurrence of the fault (15 seconds after the opening of circuit breaker 6—A), the circuit breaker 6—A recloses. If the fault has cleared, the circuit breaker 6—A remains closed, but if the fault has not cleared, the circuit breaker 6—A again trips open and is locked out.

At the expiration of 30 seconds after the fault, the circuit breaker 6—C recloses and remains closed if the fault has cleared. If the fault has not cleared, the circuit breaker 6—C again trips open and is locked out.

Assuming that the conditions prior to the fault are as stated above, except that the transformer circuit breaker 28 is open at the time of the fault, the operation upon the occurrence of a zero impedance fault at the point 46 may be set forth as follows: At the upper right intersection, the total fault current is supplied by the network main 4, as the transformer 27 is disconnected. The fault current is reduced somewhat by the impedance of the network main 4 to a value which will be assumed as 8000 amperes. As this current passes through each of the circuit breakers 6—C, 4—C and 4—B, these circuit breakers all trip open in approximately 1.0 second.

As both the intersection supplied by the transformer 27 and the network main 4 are deenergized, no voltage is available to supply the reclosing apparatus of the circuit breaker 4—C, and the timing relay of the latter circuit breaker (not shown in Fig. 2) does not commence to operate. The intersection supplied by the transformer 22, however, is energized, and at the expiration of 31 seconds after the fault, the circuit breaker 4—B recloses. The reclosure of circuit breaker 4—B supplies operating voltage to the reclosing mechanism of circuit breaker 4—C, and at the expiration of 15 seconds (46 seconds after the occurrence of the fault) the latter circuit breaker recloses. Voltage is now present for the reclosing mechanism of circuit breaker 6—C, and at the expiration of a further interval of 30 seconds, the circuit breaker 6—C recloses.

The reclosure of circuit breaker 6—C again establishes a circuit from the transformer 22 to the fault, and the circuit breakers 4—B, 4—C and 6—C again trip open in approximately 1.0 second. As the circuit breaker 6—C did not remain closed for the 10 second period required for resetting of its closing mechanism, this circuit breaker is locked out. The circuit breakers 4—B and 4—C, however, each remained closed for more than the 10 second resetting interval, and these circuit breakers are accordingly in condition for further automatic reclosures. At the expiration of further intervals of 30 seconds and 45 seconds, the circuit breakers 4—B and 4—C, respectively, reclose to restore service to the radial feeders 10 and 11.

The operation at the right center intersection is the same as described above under the first fault conditions assumed.

If a fault occurs at a different point in the network, for example the point 47 of the network main 1, the fault current which flows through each of the circuit breakers 1—A and 1—B at the ends of the faulted main divides at the intersections in the manner described above. The fault current in adjacent mains is accordingly less than that which flows through the circuit breakers 1—A and 1—B and the latter accordingly trip open well in advance of the attainment of opening conditions for the breakers in adjacent mains.

Faults which occur on the low voltage distribution circuits, such as 36 or 37, are burned clear in the usual manner, or may be cleared by fuses (not shown) in the leads of the transformer 34 if desired.

If a fault occurs on the source side of a transformer, such as the transformer 12, the corresponding transformer circuit breaker 13 is tripped open by the power-directional relay of the network unit. The circuit breaker 13 is automatically reclosed when feeder voltage is restored and the secondary voltage of the transformer 12 bears a predetermined relationship of magnitude and phase position to the network voltage.

A differential protective arrangement, which will hereinafter be described in detail, is provided in each network unit for clearing faults which may occur within the unit. Upon the occurrence of a fault within the unit, all circuit breakers of the unit are tripped open and locked out, thereby necessitating an inspection trip to the faulted network unit, before the unit can be restored to service.

Referring to Fig. 3 which shows diagrammatically the apparatus for controlling one of the network circuit breakers, such as the circuit breaker 7—A, associated with the network main 7, the circuit breaker 7—A is provided with a trip coil 50 and a closing coil 51 of any suitable type.

The trip coil 50 is connected in a trip circuit which includes a storage battery 52 and parallel contact members of an overcurrent relay, shown diagrammatically at 53 and a differential lockout relay 54.

The overcurrent relay 53 is preferably of the broad-range type disclosed in the copending application of R. M. Smith, mentioned above and comprises a plunger type overcurrent element 53—a normally held in the contact open position by a coupling spring 53c. A second spring 53b is provided for exerting a substantially constant force tending to close the relay contact members, as explained in the above-mentioned application of R. M. Smith. The free end of the coupling spring 53c is secured to a timing element 53e which for simplicity is shown as of the dashpot type. A restraining element or latch 53d is provided for securing the timing element 53e during normal conditions of the circuit to be protected. The overcurrent element 53a is energized by means of a current transformer 55 in accordance with the current in the network main 7. Various other elements of the relay 53, such as resetting and adjusting devices, which are disclosed in detail in the above-mentioned application of R. M. Smith have for simplicity been omitted.

The operation of the relay 53 under overcurrent conditions may be set forth as follows: For fault currents equal to or in excess of the instantaneous setting of the relay, the closing forces acting upon the relay armature are sufficient to cause closure of the relay contact members against the bias of the coupling spring 53c substantially instantaneously. For lower fault currents within the operating range of the relay, the initial expansion of the coupling spring 53c is insufficient to permit engagement of the relay contact members. However, upon the occurrence of the fault, the latch 53d releases the timing element 53e, and the latter gradually moves to a position which permits engagement of the relay contact members.

For the minimum overcurrent condition to which the relay responds, practically no expansion of the coupling spring 53c occurs, and the timing element 53e moves through its maximum operating distance to cause closure of the relay contact members in the maximum time interval of the relay. The operating characteristics of a properly designed relay of the type indicated above are as shown in Fig. 1.

Returning to Fig. 3, a motor-operating timing switch, shown diagrammatically at 56, is provided for controlling the automatic reclosure of the circuit breaker 7—A. The timing switch 56 is provided with a reversible operating motor 57 of any suitable type, shown diagrammatically as a split-phase induction motor, and is provided with a contact drum 58 having contact segments 60, 61 and 62 in cooperative relationship with a set of stationary contact brushes 59.

The induction motor 57 is provided with a pair of single phase stator windings 57a and 57b in quadrature space position. The windings 57a and 57b are connected in a triangular mesh with a reactor 63 in such a manner that when alternating voltage is applied to the winding 57b the stator field of the motor 57 rotates in the direction to cause engagement of the contact segments 61 and 62 with the corresponding brushes 59. When alternating voltage is applied to the stator winding 57a, the motor 57 rotates in the opposite direction to cause movement of the contact segments 61 and 62 away from the brushes 59.

A pair of voltage transformers 64 and 65 are provided for supplying low voltage to the control circuits from the intersection side or from the network side, respectively, of the circuit breaker 7—A. A change-over relay 66, energized in accordance with the voltage of the network main 7, is provided for connecting the control circuits to the voltage transformer 64 when the network main 7 is deenergized, or to the transformer 65 when the network main 7 is energized. Although I have shown an individual voltage transformer 64 for energizing the control circuits of the circuit breaker 7—A, it will be understood that a single voltage transformer may be used for all control circuits of the network unit which are energized from the intersection side.

A relay 67 is provided for controlling the closing coil 51 of the circuit breaker 7—A. The relay 67 is controlled by the contact segment 62 in such manner that it closes 20 seconds after the motor 57 commences to operate. The relay 67 is provided with auxiliary front contact members 67a for establishing a holding circuit for itself independent of the contact segment 62.

The contact segment 61 is provided for preventing the energization of the closing coil 51 until the motor 57 has been in operation for 30 seconds. The contact segment 60 serves as a limit switch for interrupting the connections of the motor 57 when the contact drum 58 reaches either its limit position in the closing direction, or its normal position, as shown in Fig. 3. The operating times of 20 seconds for the segments 62, and 30 seconds for the segment 61, correspond to those for the long reclosing-time circuit breakers such as circuit breaker 7—A. For the short reclosing-time circuit breakers, such as circuit breaker 6—A, the contact segment 62 completes its circuit in 5 seconds, and the contact segment 61 completes its circuit in 15 seconds.

The circuit breaker 7—A is provided with front auxiliary contact members 68 for preventing operation of the motor 57 in the resetting direction when the circuit breaker 7—A is open, and with back auxiliary contact members 69 for preventing operation of the motor 57 in the closing direction when the circuit breaker is closed. The circuit breaker 7—A also is provided with the usual front auxiliary contact members 70 for preventing energization of the trip coil 50 when the circuit breaker is open and with the usual back auxiliary contact members 71 for interrupting the circuit of the closing coil 51 when the circuit-breaker is in the fully closed position.

The operation of the apparatus shown in Fig. 3 may be set forth as follows: It is assumed that the circuit breaker 7—A is closed, the network main 7 is carrying current and the relays 53, 54, 66 and 67 are in the positions shown in the figure.

If an over-current condition occurs in the network main 7, the relay 53 operates with a time delay determined by its time-current characteristic as shown in Fig. 1, to complete a circuit for the trip coil 50, and the circuit breaker 7—A trips open. The circuit breaker 7—A, in opening, completes a circuit for the motor 57 by means of its back contact members 69, partially completes a circuit for the relay 67 by means of its back contact members 71; and interrupts the circuit of the trip coil 50 by means of its contact members 70.

If the voltage of the network main 9 has been greatly reduced by the fault or if the main itself has been disconnected by the opening of the circuit breaker 7—C (not shown in Fig. 3) at its other end, the change-over relay 66 drops out to connect the control circuits of the circuit breaker 7—A to the secondary winding of transformer 64. If the circuit breaker 7—C has not opened, the control circuits of the circuit breaker 7—A remain connected to the secondary winding of the transformer 65. In either case, therefore, voltage is available for the control circuits, assuming that the main transformer of the network unit is energized and connected to the intersection.

As the voltage is impressed across the winding 57a of the motor 57, the latter operates to move the contact segments 61 and 62 toward the brushes 59. At the expiration of 20 seconds after opening of the circuit breaker 7—A, the contact segment 62 engages the corresponding brushes 59 to complete a circuit for the relay 67. The relay 67 closes to partially complete a circuit for the closing coil 51 and to complete a holding circuit for itself through its contact members 67a.

As the motor 57 continues to operate, the contact segment 61 approaches the brushes 59 and, at the expiration of 30 seconds after the opening of circuit breaker 7—A, completes a circuit for the closing coil 51. The circuit breaker 7—A accordingly closes and, in closing, partially completes a circuit for the trip coil 50 by means of its auxiliary contact members 70, interrupts the circuit of the relay 67 by means of its auxiliary contact members 71 and reverses the motor 57 by means of its auxiliary contact members 68 and 69. The relay 67 now drops out, and the motor 57 operates in the resetting direction.

If, upon closure of the circuit breaker 7—A an over-current condition is again established in the network main 7, the over-current relay 53 again operates to trip open the circuit breaker 7—A. As the maximum time element of the relay 53 is 7.5 seconds, the circuit breaker 7—A opens before the contact drum 56 has reset sufficiently to complete a circuit for the relay 67. The latter relay accordingly remains open, and upon movement of the contact drum in the closing direction, the engagement of contact segment 61 with the brushes 59 does not complete a circuit for the closing coil 51. The circuit breaker 7—A remains open and is locked out when the lowermost contact brush 59 rides off of the contact segment 60.

If no over-current condition is established in the network main 7 upon closure of the circuit breaker 7—A, the motor 57 operates in the resetting direction to restore the contact drum 56 to the position shown in Fig. 3 in 30 seconds. If at any time after the expiration of 10 seconds of the resetting operation, the over-current relay 53 again causes the opening of circuit breaker 7—A, the operation of the motor 57 in the closing direction effects closure of the relay 67 by means of the contact segment 62. It will, therefore, be seen that the circuit breaker 7—A is locked out if it trips open within 10 seconds after an automatic reclosure, but is again automatically reclosed if the opening occurs at any time after the expiration of 10 seconds following automatic reclosure.

The connections and operation of the differential lockout relay 54 will be hereinafter described in connection with Fig. 4, it may be seen from Fig. 3, however, that upon closure of this relay, a circuit for the trip coil 50 is completed and all closing circuits for the circuit breaker 7—A are interrupted and locked out.

Figure 4:
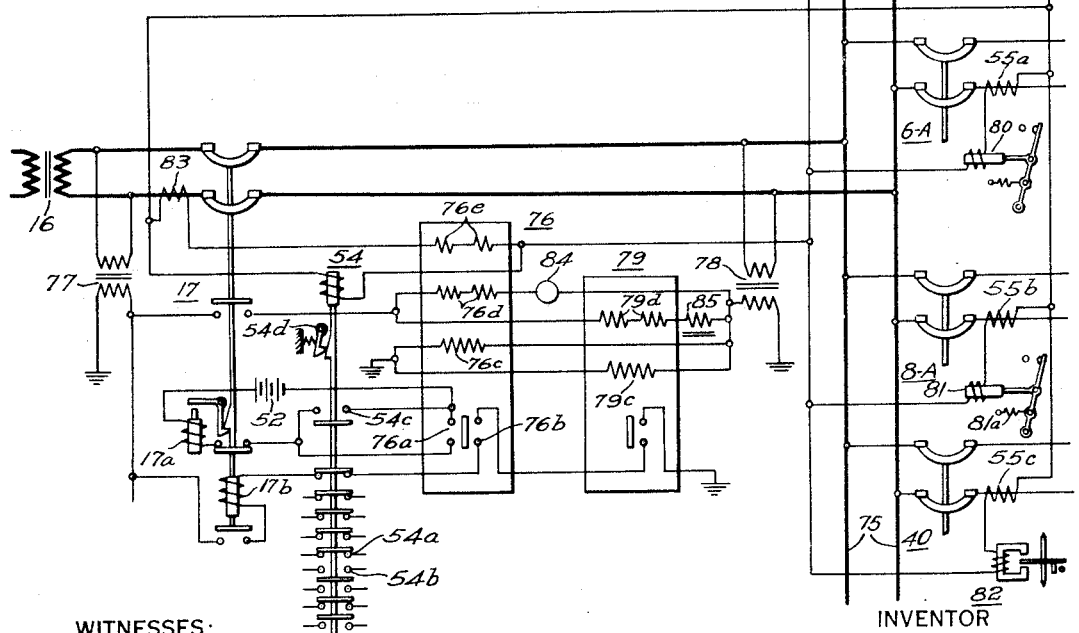
Fig. 4 is a diagrammatic view of the apparatus for controlling a transformer circuit breaker used in the practice of my invention.

Referring to Fig. 4, which shows the control apparatus associated with one of the transformer circuit breakers, such as the circuit breaker 17 of Fig. 1, the main transformer of the network unit is shown at 16. The transformer circuit breaker 17 is interposed between the transformer 16 and the network unit bus 75, to which the network circuit breakers 6—A, 7—A and 8—A and the circuit breaker 40 are connected.

The transformer circuit breaker 17 is provided with a trip coil 17a and a closing coil 17b of the usual type. A storage battery 52, which may be the same as that shown in Fig. 3, is provided for supplying current for the trip coil 17a regardless of the condition of energization of the main power circuits. Contact members 54c of the differential lockout relay 54, mentioned above in connection with Fig. 3, and tripping contact members 76a of a power directional relay 76 are connected in parallel in the circuit of the trip coil 17a.

A pair of voltage transformers 77 and 78, are provided for supplying low voltages proportional to the secondary voltage of the main transformer 16 and to the voltage of the bus 75 respectively. The closing coil 17b of the circuit breaker 17 is connected to the secondary winding of the transformer 77 in a circuit which includes closing contact members 76b of the power directional relay 76 and contact members of a phasing relay 79.

A number of broad-range over-current relays 53, 80 and 81 of the type described above in connection with Fig. 3 are provided for controlling the network circuit breakers 7—A, 6—A and 8—A, respectively and a protective relay 82 of any suitable type is provided for controlling the circuit breaker 40.

The relays 53, 80, 81 and 82 are energized by means of current transformers 55, 55a, 55b and 55c, respectively, in accordance with the currents in the circuits controlled by the corresponding circuit breakers. A current transformer 83 is provided in the secondary circuit of the main transformer 16. The current transformers 55, 55a, 55b, 55c and 83 are of the same ratio and are connected in a well known manner, so that under normal conditions the secondary current of the transformer 83 divides among the secondary windings of the transformers 55, 55a, 55b and 55c in the same proportion as the corresponding primary currents.

The coil of the differential lockout relay 54 is connected to respond to the difference current of the transformer 83 and the transformers 55, 55a, 55b and 55c. Under normal conditions no difference current flows, but if a fault occurs within the network unit, a difference current appears, and the lockout relay 54 closes. The lockout relay 54 is provided with a latch 54d of any suitable type, for maintaining the relay in operated position after it has operated, until it is manually reset. The lockout relay 54 is also provided with a plurality of sets of contact members, a pair of which are shown at 54a and 54b, for tripping open and locking out each of the circuit breakers 17, 6—A, 7—A, 8—A and 40 in the event of a fault within the network unit.

The power directional relay 76 and the phasing relay 79 may be of the usual induction disc type. The power directional relay 76 is provided with a potential winding 76c, a pair of phasing windings 76d and a pair of current windings 76e, designed and arranged in a manner well understood in the art. The phasing relay 79 is provided with a potential winding 79c and a pair of phasing windings 79d of the usual type.

A phasing lamp 84 and a phasing reactor 85, are provided for modifying the closing characteristics of the relays 76 and 79 in a well known manner. The phasing windings 76d and 79d of the relays 76 and 79, respectively, are arranged to be connected to respond to the difference voltage of the secondaries of the transformers 77 and 78 when the transformer circuit breaker 17 is open.

The potential windings 76c and 79c of the relays 76 and 79, respectively, are connected to the transformer 78 to be energized in accordance with the voltages of the network unit bus 75.

The operation of the apparatus shown in Fig. 4 may be set forth as follows: It is assumed that initially the circuit breakers 16, 6—A, 7—A, 8—A and 40 are closed, the various relays are in the positions shown in the figure and that power is flowing in the normal direction from left to right in the primary circuits shown in the figure.

If a fault occurs on the source side of the main transformer 16, the direction of power flow reverses, assuming that the network unit is connected in a network as shown in Fig. 2, and power flows from the network through the transformer 16 to the fault. In response to the reverse power flow, the power directional relay 76 operates to trip open the circuit breaker 17 in a comparatively short time interval, such as .1 second.

When the fault has cleared and the transformer 16 becomes energized from the source side, the power directional relay 76 and the phasing relay 79 operate in a well known manner to complete a circuit for the closing coil 17b when the secondary voltage of the main transformer 16 exceeds the voltage of the bus 75 and bears a predetermined phase relationship to the bus voltage.

The phase relationship of transformer secondary and bus voltages necessary to cause closure of the phasing relay 79 is determined principally by the constants of the circuit in which the phasing windings 79d and reactor 85 are included. The constants of this circuit are so chosen that under average load conditions of the network, the circuit breaker 17 can close only when power will flow from the transformer 16 into the network upon closure of the circuit breaker 17. In a majority of applications this condition requires that the difference between the transformer secondary voltage and the bus voltage lies within a leading range as compared to the bus voltage. For example, the difference voltage may be of suitable phase relationship to the bus voltage if it lies between the range of 10° lagging to 90° leading.

Faults within the network unit are cleared by the differential lockout relay 54 in the manner indicated above. Faults in the network mains are cleared by the broad range relays 53, 80 and 81 in the manner described above in connection with Fig. 2.

Although for simplicity I have described my invention in connection with single phase circuits and apparatus it will be obvious that the invention is equally applicable to polyphase circuits and apparatus.

I do not intend that the present invention shall be restricted to the specific structural details, arrangement of parts or circuit connections herein set forth, as various modifications thereof may be effected without departing from the spirit and scope of my invention. I desire, therefore, that only such limitations shall be imposed as are indicated in the appended claims.

I claim as my invention:

1. In a distribution system of the network type, a plurality of network mains arranged and connected to form a closed mesh, a pair of circuit breakers for each of said mains for controlling the connection of the corresponding main and the adjacent intersections of the mesh, means for supplying power to each of a plurality of intersections of said mesh, opening means for each of said circuit breakers, each of said opening means including a fault-responsive relay of a type operable with increasingly short time delay in response to increasingly severe fault conditions, said relays being effective to cause opening of the corresponding circuit breaker in response to a fault on the corresponding main in advance of the attainment of opening conditions for the relays of adjacent mains, and time controlled reclosing means for each of said circuit breakers, said reclosing means for alternate circuit breakers around said mesh being effective to reclose the corresponding circuit breaker after a predetermined time delay and said reclosing means for the remainder of said circuit breakers being effective to reclose the corresponding circuit breaker after a different predetermined time delay.

2. In an alternating current distribution system of the network type, a plurality of network mains arranged and connected to form a closed mesh, a plurality of transformers for supplying power to a plurality of intersections of said mesh, a transformer circuit breaker for controlling the connection of each of said transformers to the corresponding intersection of said mesh, a pair of network circuit breakers for each of said mains for controlling the connection of the corresponding main and the adjacent intersections of said mesh, opening means for each of said network circuit breakers, each of said opening means including an over-current relay of a type operable with increasingly short time delay in response to increasingly severe over-current conditions, said relays being effective to cause opening of the corresponding network circuit breaker in response to a fault on the corresponding main in advance of the attainment of opening conditions for the relays of adjacent mains if the said transformer circuit breaker for the intervening intersection is closed, time-controlled voltage-responsive reclosing means for each of said network circuit breakers, each of said reclosing means being effective to reclose the corresponding network circuit breaker after a time delay of at least a predetermined magnitude when either the adjacent intersection or the corresponding main is energized, and means for locking out each of said network circuit breakers after one reclosure thereof and a subsequent opening thereof within a predetermined short time interval, whereby upon the occurrence of a non-clearing fault on any of said mains, a plurality of said network circuit breakers are opened and closed in a sequence which leaves the faulted main disconnected and the remainder of said mains energized, regardless of the number of said transformer circuit breakers closed at the time of the fault.

3. In an alternating-current distribution system of the network type, a plurality of network mains arranged and connected to form a closed mesh, a plurality of transformers for supplying power to a plurality of intersections of said mesh, a transformer circuit breaker for controlling the connection of each of said transformers to the corresponding intersection of said mesh, a pair of network circuit breakers for each of said mains for controlling the connection of the corresponding main and the adjacent intersections of said mesh, opening means for each of said network circuit breakers, each of said opening means including an over-current relay of a type operable with increasingly short time delay in response to increasingly severe over-current conditions, said relays being effective to cause opening of the corresponding network circuit breaker in response to a fault on the corresponding main in advance of the attainment of opening conditions for the relays of adjacent mains if the said transformer circuit breaker for the intervening intersection is closed, time-controlled voltage-responsive reclosing means for each of said network circuit breakers, said reclosing means for alternate network circuit breakers around said mesh being effective to reclose the corresponding network circuit breaker after a predetermined time delay when either the adjacent intersection or the corresponding main are energized and said reclosing means for the remainder of said network circuit breakers being effective to reclose the corresponding network circuit breaker after a different predetermined time delay when either the adjacent intersection of the corresponding main are energized, and means for locking out each of said network circuit breakers after one reclosure thereof and a subsequent opening thereof within a predetermined short time interval, whereby upon the occurrence of a non-clearing fault on any of said mains, a plurality of said network circuit breakers are opened and closed in a sequence which causes the faulted main to be energized twice and finally disconnected and which leaves the remainder of said mains energized, regardless of the number of said transformer circuit breakers closed at the time of the fault.

4. In a distribution system of the network type, a plurality of network mains arranged and connected to form a closed mesh, a pair of circuit breakers for each of said mains for controlling the connection of the corresponding main and the adjacent intersections of the mesh, means for supplying power to each of a plurality of intersections of said mesh, opening means for each of said circuit breakers including a broad-range inverse-time element over-current relay, said relays being effective to cause opening of the corresponding circuit breaker in response to a fault on the corresponding main in advance of the attainment of opening conditions for the relays of adjacent mains and time controlled reclosing means for each of said circuit breakers, said reclosing means for alternate circuit breakers around said mesh being effective to reclose the corresponding circuit breaker after a predetermined time delay and said reclosing means for the remainder of said circuit breakers being effective to reclose the corresponding circuit breaker after a different predetermined time delay.

5. In an alternating-current distribution system of the network type, a plurality of network mains arranged and connected to form a closed mesh, a plurality of transformers for supplying power to a plurality of intersections of said mesh, a transformer circuit breaker for controlling the connection of each of said transformers to the corresponding intersection of said mesh, a pair of network circuit breakers for each of said mains for controlling the connection of the corresponding main and the adjacent intersections of said mesh, opening means for each of said network circuit breakers, each of said opening means including a broad-range inverse-time-element over-current relay, said relays being effective to cause opening of the corresponding network breaker in response to a fault on the corresponding main in advance of the attainment of opening conditions for the relays of adjacent mains if the said transformer circuit breaker for the intervening intersection is closed, time-controlled voltage-responsive reclosing means for each of said network circuit breakers, each of said reclosing means being effective to reclose the corresponding network circuit breaker after a time delay of at least a predetermined magnitude when the adjacent intersection is energized, and means for locking out each of said network circuit breakers after one reclosure thereof and a subsequent opening thereof within a predetermined short time interval.

6. In an alternating-current distribution system of the network type, a plurality of network mains arranged and connected to form a closed mesh, a plurality of transformers for supplying power to a plurality of intersections of said mesh, a transformer circuit breaker for controlling the connection of the corresponding transformer and the adjacent intersections of said mesh, a pair of network circuit breakers for each of said mains for controlling the connection of the corresponding main and the adjacent intersections of said mesh, opening means for each of said network circuit breakers including a broad-range inverse-time-element over-current relay, said relays being effective to cause opening of the corresponding network circuit breaker in response to a fault on the corresponding main in advance of the attainment of opening conditions for the relays of adjacent mains if the said transformer circuit breaker for the intervening intersection is closed, time-controlled voltage-responsive reclosing means for each of said network circuit breakers, said reclosing means for alternate network circuit breakers around said mesh being effective to reclose the corresponding network circuit breaker after a predetermined time delay when the adjacent intersection is energized and said reclosing means for the remainder of said network circuit breakers being effective to reclose the corresponding network circuit breakers after a different predetermined time delay when the adjacent intersection is energized, and means for locking out each of said network circuit breakers after one reclosure thereof and a subsequent opening thereof within a predetermined short time interval.

JOHN S. PARSONS.